United States Patent
Nelson et al.

(10) Patent No.: US 10,232,206 B2
(45) Date of Patent: Mar. 19, 2019

(54) SYSTEM AND METHOD FOR DETECTING FLUID LEAK

(71) Applicant: IHF, LLC., Manhattan Beach, CA (US)

(72) Inventors: James Nelson, Manhattan Beach, CA (US); Thomas Nelson, Manhattan Beach, CA (US); Jeannette Nelson, Manhattan Beach, CA (US)

(73) Assignee: IHF, LLC, Manhattan Beach, CA (US)

(*) Notice: Subject to any disclaimer, the term of this patent is extended or adjusted under 35 U.S.C. 154(b) by 155 days.

(21) Appl. No.: 15/421,575

(22) Filed: Feb. 1, 2017

(65) Prior Publication Data

US 2018/0214726 A1    Aug. 2, 2018

(51) Int. Cl.

| | | |
|---|---|---|
| *G01M 3/04* | (2006.01) | |
| *G01M 3/18* | (2006.01) | |
| *G01M 3/28* | (2006.01) | |
| *A62C 35/60* | (2006.01) | |
| *A62C 35/68* | (2006.01) | |
| *A62C 37/50* | (2006.01) | |

(52) U.S. Cl.
CPC .............. *A62C 37/50* (2013.01); *A62C 35/60* (2013.01); *A62C 35/605* (2013.01); *A62C 35/68* (2013.01); *G01M 3/04* (2013.01); *G01M 3/184* (2013.01); *G01M 3/2876* (2013.01)

(58) Field of Classification Search
CPC ...... G01M 3/04; G01M 3/184; G01M 3/2876; A62C 37/50; A62C 35/60; A62C 35/605; A62C 35/68
See application file for complete search history.

(56) References Cited

U.S. PATENT DOCUMENTS

| | | |
|---|---|---|
| 5,315,291 A | 5/1994 | Furr |
| 5,409,037 A | 4/1995 | Wheeler et al. |
| 6,940,409 B1 | 9/2005 | Green |
| 7,042,235 B2 * | 5/2006 | Strackbein .............. G01M 3/18 324/686 |
| 8,289,173 B2 | 10/2012 | Ben-Mansour et al. |
| 9,105,175 B1 | 8/2015 | Cantolino et al. |
| 9,383,289 B1 | 7/2016 | Meyer |
| 2016/0284193 A1 | 9/2016 | Davis et al. |

FOREIGN PATENT DOCUMENTS

JP         2000037473 A   *   2/2000

* cited by examiner

*Primary Examiner* — Paul M. West
(74) *Attorney, Agent, or Firm* — Foley & Lardner LLP

(57) ABSTRACT

A device for detecting and catching a leak from a fire sprinkler includes a leak sensor configured to detect the leak, and a leak catcher configured to catch the leak before the leak makes contact with surrounding areas. The device also includes an alarm module configured to issue a notification upon detection of the leak, and a mounting mechanism configured to removably mount the leak sensor, the leak catcher, and the alarm module to the fire sprinkler in a manner that does not obstruct operation of the fire sprinkler.

20 Claims, 4 Drawing Sheets

US 10,232,206 B2

SYSTEM AND METHOD FOR DETECTING FLUID LEAK

BACKGROUND

The following description is provided to assist the understanding of the reader. None of the information provided or references cited is admitted to be prior art.

Fire sprinkler systems are often used to suppress or at least mitigate fire in a variety of residential, commercial, and industrial applications. Fire sprinkler systems typically include one or more fire sprinklers connected to a supply system that supplies water or another fire suppression agent to the fire sprinklers for suppressing or mitigating fire. Present day fire sprinklers have limitations due to their configuration and the way they operate. Specifically, fire sprinklers have a tendency to leak.

SUMMARY

In accordance with some aspects of the present disclosure, a device is disclosed. The device includes a leak sensor configured to detect a leak from a fire sprinkler and a leak catcher configured to catch the leak before the leak makes contact with surrounding areas. The device also includes an alarm module configured to issue a notification upon detection of the leak and a mounting mechanism configured to removably mount the leak sensor, the leak catcher, and the alarm module to the fire sprinkler in a manner that does not obstruct operation of the fire sprinkler.

In accordance with some other aspects of the present disclosure, a method is disclosed. The method includes mounting a leak management device removably to a fire sprinkler, such that the mounting of the leak management device does not obstruct operation of the fire sprinkler. The method also includes detecting a leak from the fire sprinkler using a leak sensor of the leak management device, and catching the leak from the fire sprinkler using a leak catcher of the leak management device before the leak makes contact with surrounding areas. The method further includes issuing at least one notification for alerting to the leak.

In accordance with yet other aspects of the present disclosure, a system is disclosed. The system includes a leak management device configured to detect and catch a leak. The leak management device includes a leak sensor configured to detect the leak, a leak catcher configured to catch the leak before the leak makes contact with surrounding areas, and an alarm module configured to issue a notification upon detection of the leak by the leak sensor. The system further includes a user interface device associated with a user, the user interface device configured to receive the notification.

The foregoing summary is illustrative only and is not intended to be in any way limiting. In addition to the illustrative aspects, embodiments, and features described above, further aspects, embodiments, and features will become apparent.

Figure 1:
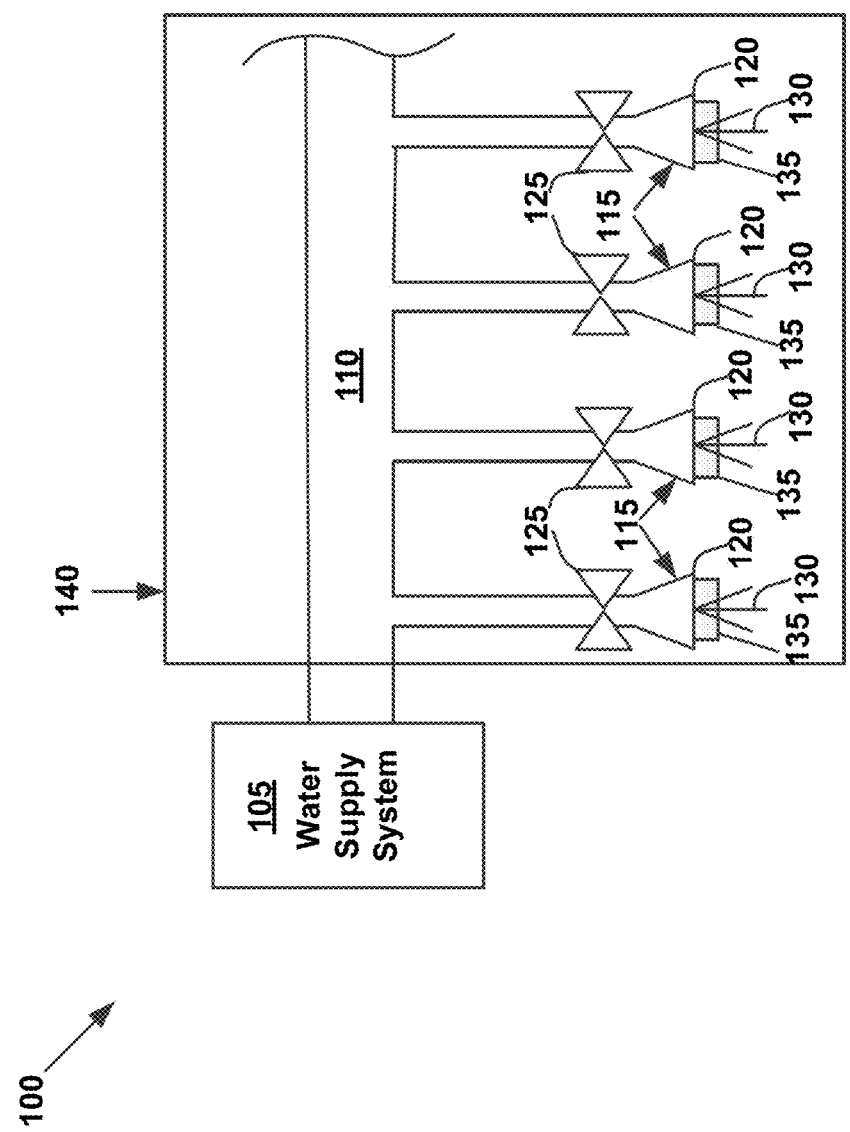
FIG. 1 is an illustrative block diagram of a fire sprinkler system, in accordance with at least some embodiments of the present disclosure.

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

The present disclosure relates to a leak management system having a leak management device for managing a leak from a fire sprinkler. The leak management device includes a leak sensor for detecting the leak, and a leak catcher for catching the leak before the leak hits and causes damage to the surrounding areas of the fire sprinkler. The leak management device also includes an alarm module configured to issue one or more notifications for alerting a user to the leak. The leak management device is also configured to be removably mounted to the fire sprinkler using a mounting mechanism, such that after mounting, the leak management device does not interfere with or obstruct the normal operation of the fire sprinkler.

Referring now to FIG. 1, a fire sprinkler system 100 is shown, in accordance with at least some embodiments of the present disclosure. The fire sprinkler system 100 includes a water supply system 105 connected via a water distribution system 110 to fire sprinklers 115. The water distribution system 110, which includes an interconnected network of pipes, is configured to draw water from the water supply system 105 and direct that water to the fire sprinklers 115. Each of the fire sprinklers 115 includes a sprinkler head 120, and a valve 125 that facilitates dispensing of water through the sprinkler head in case of fire. When any of the fire sprinklers 115 detect an elevated temperature indicative of a fire, the valve 125 of that fire sprinkler is configured to automatically open to direct a continuous stream of water 130 through the sprinkler head 120 over a particular coverage area to suppress or at least mitigate the fire.

In some embodiments, the water supply system 105 that supplies water to the fire sprinklers 115 may be a municipal or city water supply, an overhead water tank, an underground reservoir, a well, or any other type of water supply that is capable of providing a constant and reliable stream of water at adequate pressure and flowrate to the fire sprinklers. Although not shown, the water supply system 105 may include a variety of pumps, pipes, valves, and other components that are needed or may be considered desirable to supply water to the fire sprinklers 115. Furthermore, although the water supply system 105 has been described as supplying water to the fire sprinklers 115, in some embodiments, another type of fire extinguishing or fire suppressing agent may be used. In such cases, the water supply system 105 may be configured to supply that fire extinguishing or fire suppressing agent instead of water.

Additionally, in at least some embodiments, each of the fire sprinklers 115 may be configured for independent activation, such that an instance of the fire sprinkler is activated only when that respective fire sprinkler senses the elevated temperatures indicative of fire. In other embodiments, each of the fire sprinklers 115 may be configured for simultaneous actuation or along with a group of other fire sprinklers. It is to be understood that although only four of the fire sprinklers 115 have been shown in FIG. 1, in other embodiments, the number of fire sprinklers may vary to include fewer than or greater than four fire sprinklers, depending upon the application in which the fire sprinkler system 100 is implemented. Furthermore, the orientation of each of the fire sprinklers 115 may vary in other embodiments. Although the fire sprinklers 115 are shown to dispense the water 130 in a vertical or substantially vertical direction, in other embodiments, at least some of the fire sprinklers may be oriented to dispense water in a horizontal or substantially horizontal direction, or other directions as deemed necessary.

Moreover, in some embodiments, each of the fire sprinklers 115 may be configured to eject the water 130 from the sprinkler head 120 in varying ways. For example, in some embodiments, one or more of the fire sprinklers 115 may be configured to dispense the water 130 from the sprinkler head 120 in the form of a spray. In other embodiments, one or more of the fire sprinklers 115 may be configured to discharge the water 130 from the sprinkler head 120 in the form of a mist, foam, spiral, and other convergent or divergent jet streams. Likewise, the velocity and pressure with which the water 130 is discharged from the sprinkler head 120 may vary from one embodiment to another, depending upon the velocity and pressure with which the water is supplied from the water supply system 105 and the water distribution system 110, as well as the application in which the fire sprinkler system 100 is implemented.

Each of the fire sprinklers 115 also includes a leak management device 135 that monitors for any undesirable leaks through the sprinkler head 120 when the fire sprinklers 115 are not operating. The leak management device 135 may be used to detect a leak and issue notifications when the leak is detected. In some embodiments, the leak management device 135 is also configured to catch the leak, thereby preventing damage to surrounding areas that may otherwise be damaged from the leak. Furthermore, the leak management device 135 may be configured so as not to interfere with the normal operation of the fire sprinklers 115. These and other aspects of the leak management device 135 are described in greater detail below.

It is to be understood that only some components (e.g., the water supply system 105, the water distribution system 110, and the fire sprinklers 115) of the fire sprinkler system 100 have been shown and described herein. Nevertheless, other components that may be needed, or considered desirable, to include within or use in conjunction with the fire sprinkler system 100, may be provided in other embodiments. For example, in some embodiments, insulation mechanisms, various pumps, valves, repeaters, diverters, water monitoring systems, etc. may be needed or considered desirable to include in the fire sprinkler system 100. Furthermore, the fire sprinkler system 100 may be any of a variety of types of fire sprinkler systems, including, pre-action, dry pipe, wet pipe, deluge, or any other type of fire sprinkler system that uses water or a fire extinguishing agent, either alone or in conjunction with another agent (e.g., pressurized air), to suppress or mitigate a fire.

The fire sprinkler system 100 may be installed within a building 140. Although not shown, in at least some embodiments, the building 140 may have one or more of walls, roof, windows, doors, foundation, and other features found in buildings. Furthermore, the building 140 may be any of a variety of structures such as a residential house, commercial building, warehouse, hospital, store, factory, hotel, arena, stadium, airport, museum, or any other suitable building where fire protection using the fire sprinkler system 100 is needed or desired. In other embodiments, the building 140 may also include any other structure that is substantially permanent or temporary, such as tunnels, caves, tents, stages, or any above ground or underground structure where fire protection using the fire sprinkler system 100 is needed or desired.

Furthermore, although the water supply system 105 has been shown as being outside the building 140, in some embodiments, at least a portion of the water supply system may be encompassed within the building. Likewise, although the water distribution system 110 is shown substantially within the building 140, in some embodiments, greater or smaller portions of the water distribution system may be outside the building 140.

Figure 2:
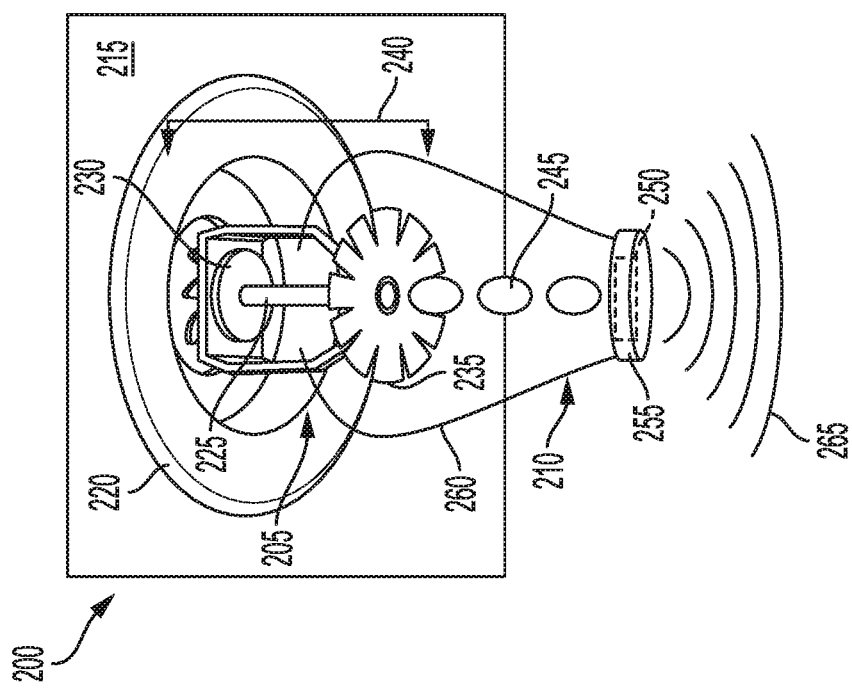
FIG. 2 is an example illustration of a leak management system used within the fire sprinkler system of FIG. 1, in accordance with at least some embodiments of the present disclosure.

Turning now to FIG. 2, a leak management system 200 is shown, in accordance with at least some embodiments of the present disclosure. The leak management system 200 includes a fire sprinkler 205 and a leak management device 210. The fire sprinkler 205 may be installed on a wall, ceiling, or other structure 215 of the building 140 using a mounting mechanism 220. The fire sprinkler 205 includes a bulb 225 that applies pressure on a plug 230. The plug 230 is connected to the water distribution system 110 (running inside the structure 215). The bulb 225 keeps the plug 230 shut, thereby preventing water in the water distribution system 110 from flowing through sprinkler nozzle 235 when there is no fire. As used herein, the bulb 225, the plug 230, and the sprinkler nozzle 235 are collectively referred to as a sprinkler head 240 (e.g., the sprinkler head 120). In operation, the bulb 225 may be filled with a heat sensitive liquid, such that as ambient temperatures around the bulb rise from heat of a fire, the heat sensitive liquid expands and breaks the bulb. Breaking of the bulb 225 releases the plug 230, which then directs water from the water distribution system 110 to the sprinkler nozzle 235, which then dispenses the water over a coverage area.

Thus, the water is prevented from dispensing by virtue of pressure applied by the bulb 225 on the plug 230 when there is no indication of fire. In some cases, the bulb 225 and/or the plug 230 may malfunction, such that a leak 245 may develop through the sprinkler head 240. The leak 245 may be a slow leak or a heavy leak. Because of a slower rate of discharge, a slow leak may be difficult to detect, but may still cause substantial property and structural damage over time. In contrast, a heavy leak may not be difficult to detect, but may cause significant damage in a short period of time. The leak 245 through the sprinkler head 240 causes not only structural and property damage, the leak also wastes water, and may necessitate water damage insurance claims. Thus, timely detecting and preventing the leak 245 through the sprinkler head 240 is advantageous.

Therefore, the present disclosure provides the leak management device 210 that may be mounted to the fire sprinkler 205 for detecting the leak 245 in a timely and reliable manner. To detect the leak 245, the leak management device 210 includes a leak detector 250 that is configured to detect even minute quantities of a liquid leak through the sprinkler head 240. In some embodiments, the leak management device 210 also includes a leak catcher 255 configured to catch a specific volume of the leak 245. By catching the leak 245, the leak catcher 255 prevents the leak from making contact with areas surrounding the fire sprinkler 205, and preventing structural and property damage to those surrounding areas from the splattering of water from the leak. The leak management device 210 may include a mounting mechanism 260 to facilitate mounting of the leak management device to the fire sprinkler 205. The leak management device 210 also includes an alarm module (See FIG. 3) that may be configured to issue a variety of alerts and alarms 265 upon detection of the leak 245. Thus, the leak management device 210 provides a convenient, reliable, and cost effective mechanism to detect and catch leaks (e.g., the leak 245) timely, as well as to notify appropriate people or entities of the leak such that any remedial action to fix the leak may be taken.

Figure 3:
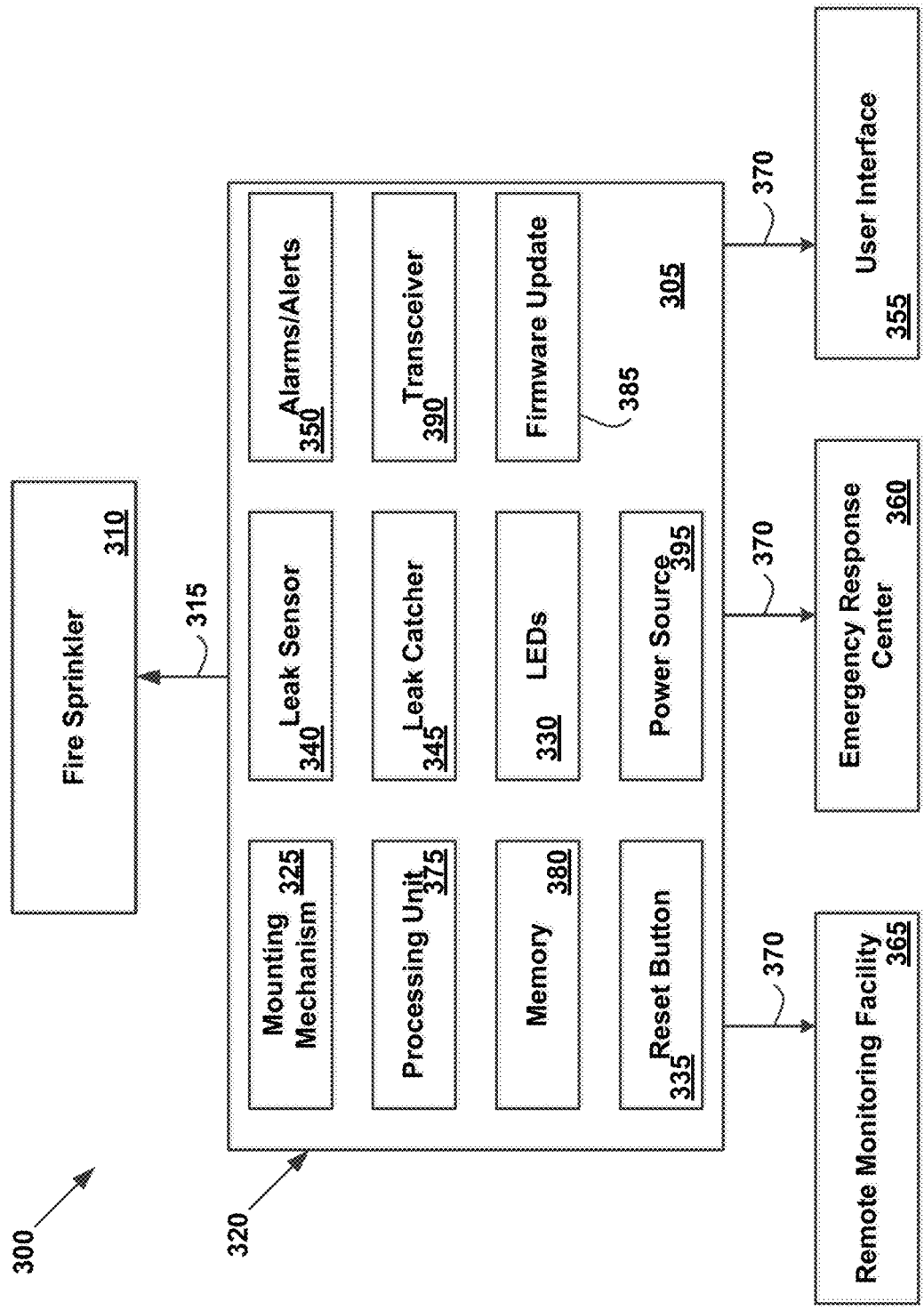
FIG. 3 is an illustrative block diagram of the leak management system of FIG. 2, in accordance with at least some embodiments of the present disclosure.

Referring to FIG. 3 now, a block diagram of a leak management system 300 is shown, in accordance with at least some embodiments of the present disclosure. The leak management system 300 includes a leak management device 305 that is configured to detect leaks from a fire sprinkler 310, as represented by communication link 315. The leak management device 305 is similar to the leak management device 210 of FIG. 2 and the leak management device 135 of FIG. 1. The leak management device 305 includes a housing 320 designed to enclose and protect various components of the leak management device from environmental and physical hazards. The shape and size of the housing 320 may vary from one embodiment to another. In general, the housing 320 is intended to have a compact and light weight profile, such that the fire sprinkler 310 and/or the structure 215 of the building 140 may be able to bear the weight of the leak management device 305 upon mounting.

The housing 320 may be constructed in one or more pieces from one or more materials that may be deemed suitable for the leak management device 305. In some embodiments, the housing 320 may be constructed of a material that is configured to withstand increased temperatures found in fire settings for a specific period of time without being damaged. For example, in some embodiments, the housing 320 may be configured to withstand at least 500° Celsius for at least 30 minutes during a fire. In other embodiments, the housing 320 may be designed with different specifications of temperature and time. Likewise, the housing 320 may be configured to withstand other environmental or physical hazards that may be found in the surroundings where the leak management device 305 is installed.

The housing 320 includes a mounting mechanism 325 configured to mount the leak management device 305 to the fire sprinkler 310. For example, in some embodiments, the mounting mechanism 325 may include mounting holes on a surface of the housing 320 that may be used to mount the leak management device 305 to the fire sprinkler 310, and/or to surrounding walls or ceilings (e.g., the structure 215) near the fire sprinkler. In other embodiments, the mounting mechanism 325 may include clips, hooks, screws, bolts, clamps, nails, magnets, string or wires, cleats, adhesive, latches, or any other mechanism that may be used to hang or suspend the leak management device 305 from the fire sprinkler 310 in a safe and reliable way. In some embodiments, instead of suspending the leak management device 305 from the fire sprinkler 310 (as shown in FIG. 2), the mounting mechanism 325 may be used to attach the leak management device to the fire sprinkler by any of a variety of ways. In yet other embodiments, the mounting mechanism 325 may be used to integrate the leak management device 305 with the fire sprinkler 310, for example, during manufacture of the fire sprinkler. In some embodiments, the mounting mechanism 325 may include a combination of suspending, attaching, and/or integrating mechanisms to mount the leak management device 305 to the fire sprinkler 310. By virtue of using different ways to mount the leak management device 305 using the mounting mechanism 325, the leak management device may be configured as a retrofit device that may be easily removed and reattached, or the leak management device may be configured to be non-removable, as may be desired or needed.

Furthermore, the mounting mechanism 325 may be used to mount the leak management device 305 on an outside surface of the fire sprinkler 310, or in some embodiments, on an inner surface of the fire sprinkler (e.g., inside the plug 230) to detect and catch the leak 245. In some embodiments, the mounting mechanism 325 may mount the leak management device 305 to be partly inside the fire sprinkler 310 and partly outside. For example, in such embodiments, the mounting mechanism 325 may mount the leak management device 305 such that a leak detection portion of the leak management device is inside the fire sprinkler 310, and a leak catching portion of the leak management device is outside the fire sprinkler. In some embodiments, the mounting mechanism 325 may mount the leak management device 305 such that the leak detection and catching mechanisms are both inside the fire sprinkler 310, while an alarm and control panel of the leak management device is outside the fire sprinkler for easy access. The mounting mechanism 325 may be used to mount the leak management device 305 in other configurations as well.

Additionally, the mounting mechanism 325 may mount the leak management device 305 relative to the fire sprinkler 310 in a variety of orientations. In some embodiments, the mounting mechanism 325 may mount the leak management device 305 to be directly in a path of the leak (e.g., the leak 245) to catch and detect the leak. In other embodiments, the mounting mechanism 325 may mount the leak management device 305 such that at least a portion of the leak management device is not in a direct path of the leak (e.g., the leak 245). For example, in such embodiments, the mounting mechanism 325 may mount the leak management device 305 such that a leak catching portion of the leak management device is in a path of the leak to catch the leak, while a leak detecting portion is not in a path of the leak. The mounting mechanism 325 may mount the leak management device 305 in other orientations as well.

Furthermore, the mounting mechanism 325 is configured to mount the leak management device 305 to the fire sprinkler 310 in a manner that does not obstruct the normal operation of the fire sprinkler. For example, the mounting mechanism 325 is configured to mount the leak management device 305 to the fire sprinkler 310 such that the leak management device does not obstruct the bulb 225, the plug 230, and the sprinkler nozzle 235 of the fire sprinkler. Specifically, the mounting mechanism 325 mounts the leak management device 305 to the fire sprinkler 310 such that the leak management device does not alter the ambient temperature around the bulb 225 to avoid the bulb from making erroneous indications of fire, or not indicating a fire when there is indeed a fire. Likewise, the mounting mechanism 325 mounts the leak management device 305 to the fire sprinkler 310 such that the plug 230 is not prevented from opening and directing water (or another fire suppression agent) to the sprinkler nozzle 235 when the bulb 225 indicates a fire.

Additionally, the mounting mechanism 325 mounts the leak management device 305 to the fire sprinkler 310 such that the leak management device does not hamper the movement (e.g., rotational movement) of the sprinkler nozzle 235, and also does not create unintended obstructions in the trajectory of the water (or another suppression agent) that is dispensed from the sprinkler nozzle during a fire. Thus, in some embodiments, the mounting mechanism 325 may mount the leak management device 305 to be suspended far beneath and/or far offset the fire sprinkler 310, such that the leak management device does not obstruct the operation of the sprinkler nozzle 235, but still facilitates leak detection and catching. Similarly, in some embodiments, the mounting mechanism 325 may mount the leak management device 305 to encompass the fire sprinkler 310, but far enough from the bulb 225 and the plug 230, such that the operation of those components is not obstructed. Thus, the mounting mechanism 325 may mount the leak management device 305 to the fire sprinkler 310 (and in some cases to the structure 215 of the building 140 around the fire sprinkler) in a variety of ways (including ways not described herein) to effectively detect and catch leaks (e.g., the leak 245), but without obstructing the normal operation of the fire sprinkler.

Accordingly, the leak management device 305 may be positioned and mounted relative to the fire sprinkler 310 in a variety of ways, in a variety of configurations, and in a variety of orientations using the mounting mechanism 325. Also, similar to the housing 320, the mounting mechanism 325 may be configured to withstand a variety of environmental and physical hazards, including, for example, elevated temperatures for a specific period of time. In some embodiments, the mounting mechanism 325 may include a variety of safety mechanisms, such as, tamper switches, to prevent tampering of the leak management device 305.

The leak management device 305 may also include one or more light emitting diodes (LEDs) 330 on a front and/or a back surface of the housing 320 to provide indication of one or more conditions. For example, in some embodiments, the LEDs 330 may include a power LED to indicate whether the leak management device is turned on or turned off. The LEDs 330 may also include a battery status LED to indicate when batteries of the leak management device 305 need to be replaced, a leak detector LED to indicate when the leak management device has detected a leak, a leak catcher LED to indicate when a leak catching portion of the leak management device is full and needs to be emptied or replaced, an alarm LED to indicate when the leak management device is issuing or has issued one or more notifications, etc. The LEDs 330 may also include a network LED to indicate when the leak management device 305 is connected to a network, a system LED to indicate malfunctions in any component of the leak management device, etc. In other embodiments, other, fewer, or additional LEDs to indicate a variety of conditions may be used.

Furthermore, the manner of indicating a condition using the LEDs 330 may vary from one embodiment to another. In some embodiments, the LEDs 330 may use color indications to indicate a condition. For example, in some embodiments, the LEDs 330 may use a green color to indicate a normal operation or condition, and a red color to indicate an abnormal condition or a condition that needs attention. Likewise, in some embodiments, the LEDs 330 may use a green color indication to that the leak management device 305 is turned on and a red indication to indicate that the leak management device is turned off. In other embodiments, the LEDs 330 may use other colors for indicating various conditions. In yet other embodiments, instead of using different color indications to indicate different condition, the LEDs may be turned on (e.g., light up, and blink or maintain a steady light) to report a condition (e.g., power on, leak detected, etc.) and turned off (e.g., not light up) when there is no condition to report (e.g., power off, no leak detected, etc.).

Thus, the manner of indicating (e.g., by color indicator or turning on/off) a condition by the LEDs 330 may vary from one embodiment to another. Furthermore, the shape, size, and arrangement of the LEDs 330 on the housing 320 may vary from one embodiment to another. By virtue of reviewing the status of the LEDs 330, a user may quickly and conveniently determine the status of the leak management device 305.

The leak management device 305 may also include a reset button 335, in some embodiments. The reset button 335 may be actuated by any of a variety of ways, such as, by pushing, sliding, rocking, rotating, pulling, magnetizing, depressing, etc. The reset button 335 may be actuated during installation of the leak management device 305 to activate the leak management device. In some embodiments, the reset button 335 may also be used for troubleshooting, for example, to factory reset the leak management device to return the leak management device settings to a factory default. In some embodiments and, particularly in the absence of a separate power button, the reset button 335 may also be used to reboot the leak management device 305. Similar to the LEDs 330, the shape, size, and arrangement of the reset button 335 on the housing 320 may vary from one embodiment to another.

Referring still to FIG. 3, the leak management device 305 also includes a leak sensor 340 and a leak catcher 345. The leak sensor 340 is configured to detect even minute amounts of a liquid leak from the fire sprinkler 310. In some embodiments, the leak sensor 340 is a water sensor to detect water leaks. In other embodiments where another type of a fire suppressing agent is used, the leak sensor 340 is suitable for detecting that type of the fire suppressing agent. Furthermore, the placement of the leak sensor 340 on or within the leak management device 305 may vary from one embodiment to another, depending upon the type of sensor. For example, in some embodiments, the leak sensor 340 may be required to physically contact the leak (e.g., the leak 245) to detect the leak, and therefore, the leak sensor may need to be placed in a path of the leak to detect that leak. In other embodiments, the leak sensor 340 may be configured to detect the leak without physically coming into contact with the leak, and in those embodiments, the leak sensor may or may not be positioned in a path of the leak.

When the leak sensor 340 is configured to detect the leak without coming into physical contact with the leak, the leak sensor may use another property of the water or the fire suppressing agent to detect the leak. For example, in some embodiments, the leak sensor 340 may be an acoustic sensor to detect acoustic vibrations generated by the leak, an odor sensor to detect specific odors of the fire suppressing agent, a chemical sensor to detect specific chemicals in the fire suppressing agent, or any other type of sensor configured to detect other properties of water or the fire suppressing agent. Furthermore, in some embodiments, the leak sensor 340 is configured so as to distinguish between certain degrees of condensation from other sources and a leak from the fire sprinkler 310, such that the leak management device issues a notification only when leaks from the fire sprinkler are detected, thereby avoiding any false alarms. Additionally, in some embodiments, the leak sensor 340 may be configured to detect gaseous leaks, instead of, or in addition to, detecting liquid leaks. For example, when the fire suppressing agent is a gaseous material, the leak sensor 340 may be used to detect leaks of that gaseous material from the fire sprinkler 310.

In contrast to the leak sensor 340, which detects the leaks, the leak catcher 345 catches the leaks and prevents damage to surrounding areas (e.g., furniture, carpet, walls, etc.) of the fire sprinkler 310 from those leaks. In some embodiments, the leak catcher 345 may be a petri dish type of device having a leak collecting area that may be positioned in a path of the leak to catch any leaks from the fire sprinkler 310. In other embodiments, the leak catcher 345 may be a tray type device, or may assume other configurations. The shape and size of the leak catcher 345 may vary based upon the amount of leak that the leak catcher is intended to catch. Further, in some embodiments, the leak catcher 345 may include one or more gaskets, or other leak proofing mechanisms to contain the leak without spilling/leaking.

In some embodiments, the leak catcher 345 may be configured to encapsulate at least a portion of the leak sensor 340. Thus, the leak catcher 345 and the leak sensor 340 may be integrated together as a single component. In other embodiments, the leak catcher 345 and the leak sensor 340 may be provided as separate components within the leak management device 305. Generally speaking, the configuration of the leak sensor 340 and the leak catcher 345 may vary based upon the type of the leak sensor (e.g., whether the leak sensor needs to physically contact or not contact the leak), as well as the size, shape, and configuration of the leak catcher.

Upon detecting a leak (e.g., the leak 245), the leak management device 305 is configured to issue a variety of alerts and alarms using an alarm module 350. For example, in some embodiments, the alarm module 350 may be configured to activate one or more of the LEDs 330 when the leak sensor 340 detects a leak to provide a visual alarm. The LEDs 330 may be configured to turn on, and either blink or maintain a steady light, to indicate the leak. In some embodiments, in addition to, or instead of, activating the LEDs 330, the alarm module 350 may issue an audible alarm by way of chirps or other tones to draw attention. In yet other embodiments, the alarm module 350 may, additionally or alternatively, be configured to issue remote or wireless alarms. For example, the alarm module 350 may be configured to issue notifications to a user interface device 355, an emergency response center 360, and/or a remote monitoring facility 365 via communication link 370.

The user interface device 355, in some embodiments, is configured to receive and/or provide information from/to a user. The user(s) may be homeowners, building or property managers, emergency response crew, etc. The user interface device 355 may be any suitable user interface. For example, in some embodiments, the user interface device 355 is a portable device associated with the user. In such embodiments, the user interface device 355 may be a smartphone or other cellular device, wearable computing device (e.g., eyewear, a watch, bracelet, etc.), tablet, portable gaming device, or laptop. In other embodiments, the user interface device 355 is another type of portable computing device or possibly a non-portable computing device that is configured to receive notifications from the alarm module 350 via the communication link 370, as well as used to navigate menus, adjust options, adjust settings, adjust display, etc.

The user interface device 355 may, in some embodiments, also include a variety of input and output interfaces. For example, the user interface device 355 may use various input technologies including, but not limited to, a keyboard, a stylus and/or touch screen, a mouse, a track ball, a keypad, a microphone, voice recognition, motion recognition, disk drives, remote controllers, input ports, one or more buttons, dials, joysticks, etc. to allow an external source, such as the user, to enter information into the user interface device. The user interface device 355 may also be configured to provide an interface for presenting information to external systems, users, memory, etc. For example, the user interface device 355 may include an interface for a display, a printer, a speaker, alarm/indicator lights, a network interface, a disk drive, a computer memory device, etc. The user interface device 355 may further include a color display, a cathode-ray tube (CRT), a liquid crystal display (LCD), a plasma display, an organic light-emitting diode (OLED) display, etc. The user interface device 355 may also include a variety of processing units, memory storage, and other devices and components that may be needed to operate the user interface device as intended, as well as to receive and process notifications from the alarm module 350.

In some embodiments, the user interface device 355 may also have a mobile application installed thereon that may be used to receive the notifications from the alarm module 350. In other embodiments, the alarm module 350 may issue notifications to the user interface device 355 via text (e.g., short messaging service) messages or email messages. In yet other embodiments, the alarm module 350 may be configured to issue notifications on social media that may be accessed on the user interface device 355. Thus, the alarm module 350 may be configured to issue notifications to the user interface device 355 in a variety of ways. Likewise, the user interface device 355 is intended to be configured in a variety of ways to receive the notifications from the alarm module 350, and possibly store, process, and take additional actions on the notifications using the user interface device.

In addition to, or instead of, notifying a user via the user interface device 355, the alarm module 350 may contact (e.g., call) the emergency response center 360 and/or the remote monitoring facility 365. The emergency response center 360 may include a 911 call center, a fire department, police department, other emergency response service, or a combination thereof. Likewise, the remote monitoring facility 365 may include a dedicated monitoring service configured to receive notifications from the alarm module 350 and further configured to notify the emergency response center 360, or take another action, if needed.

The communication link 170 through which the alarm module 350 issues notifications to the user interface device 355, the emergency response center 360, and/or the remote monitoring facility 365 may be any of a variety of communication channels or interfaces. In some embodiments, the communication link 170 may be wired communication links (e.g., jacks, antennas, transmitters, receivers, transceivers, wire terminals, electrical cables and connectors, etc.) that communicate via wired communication protocols, such as TCP/IP, BACnet IP, BACnet MSTP, CAN, Modbus, USB, Firewire, UART, SPI, RS-485, a public switched telephone network (PSTN), or other wired protocols. In other embodiments, the communication link 170 may instead be wireless and communicate via one or more wireless communication protocols, such as Wi-Fi (including TCP/IP), Wi-Max, Bluetooth, LoRa, NFC, Zigbee, and the like. In some embodiments, the communication link 170 may include cellular or mobile phone communications, wireless radio channels, local area network (LAN), metropolitan area network (MAN), wide area network (WAN), world wide web (WWW) or the Internet, and the like. A combination of one or more communication interfaces discussed above may be used for the communication link 170 as well, in some embodiments. The communication link 170 may also be a distributed intelligent network, in some embodiments, or other types of suitable networks.

Furthermore, in some embodiments, the alarm module 350 may be directly or indirectly connected to, or possibly integrated with, the leak sensor 340 and/or the leak catcher 345, and configured to be activated automatically when the leak sensor detects a leak and/or the leak catcher catches a leak. For example, the leak sensor 340 may be configured to issue an indication when a leak is detected, and the alarm module 350 may receive that indication and automatically trigger to issue the notifications. By virtue of being connected to, or integrated with, the leak sensor 340 and/or the leak catcher 345, and automatically issuing notifications, the present disclosure avoids the need of having a separate control panel configured to trigger the alarm module 350 when a leak is detected, thereby reducing the overall profile and weight of the leak management device. However, in some embodiments, it may be desirable for the leak management device 305 to include a control panel, particularly where the leak management device is desired to include additional functionalities (e.g., generating reports, controlling components of the fire sprinkler system 100 to shut off the water supply, etc.).

Thus, when present, the control panel may include one or more of a processing unit 375, a memory 380, a firmware update module 385, and a transceiver 390. In some embodiments, one or more of the processing unit 375, the memory 380, the firmware update module 385, and the transceiver 390 need not be provided on the leak management device 305 itself. Rather, one or more of those components may be remotely located (e.g., at the remote monitoring facility 365, or on a cloud computing device), such that the compact and light weight profile of the leak management device 305 may be maintained, while providing ability to include additional functionalities.

The processing unit 375, when present, is capable of executing computer code for running one or more processes described herein. The processing unit 375 may be implemented in hardware, firmware, software, or any combination thereof. The term "execution" is, for example, the process of running an application or the carrying out of an operation called for by an instruction. The instructions may be carried out by a special purpose computer, logic circuits, or hardware circuits. The instructions may be written using one or more programming language, scripting language, assembly language, etc. The processing unit 375 may retrieve a set of instructions from a permanent memory device such as a read only memory (ROM) device and copy the instructions in an executable form to a temporary memory device that is generally some form of random access memory (RAM) device. The processing unit 375 may include multiple processors that use the same or a different processing technology.

The processing unit 375, thus, executes an instruction, meaning that it performs the operations called for by that instruction. The processing unit 375 operably couples with the memory 380, the firmware update module 385, and the transceiver 390 to receive, to send, and to process information, and to control the operations of the leak management device 305.

The memory 380 may be used for storing data from the leak management device 305 and/or computer code for completing and/or facilitating various processes described in the present disclosure. Such memory may include volatile and/or non-volatile memory including, random access memory (RAM), read-only memory (ROM), dynamic random access memory (DRAM), programmable read only memory (PROM), erasable programmable read only memory (EPROM), electrically erasable programmable read only memory (EEPROM), flash memory, hard drive storage, optical memory, or any other suitable memory for storing data, software objects and/or computer instructions. In some embodiments, the memory 380 may be configured to buffer data for a period of time.

The control panel may also include the firmware update module 385. The firmware update module 385 may be used to receive and apply firmware updates to the control panel. In some embodiments, the firmware update module 385 may be configured for firmware-over-the-air (FOTA) updates. In other embodiments, the firmware update module 385 may be configured to receive firmware updates via other mechanisms. Furthermore, in some embodiments, the firmware update module 385 may be configured such that the operation of the leak management device 305 is not obstructed during the download and installation of the firmware updates. Thus, the leak management device 305 may continue normal operation (e.g., detecting and catching leaks, and issuing notifications) while the firmware update module 385 is downloading and applying the firmware updates.

Although the firmware update module 385 is shown as a separate module, in some embodiments, the firmware update module may be integrated with either or both of the processing unit 375 and the memory 380. Likewise, the processing unit 375 and the memory 380, in some embodiments, may be integrated together.

With respect to the transceiver 390, the transceiver is configured to receive and/or transmit information to/from the leak management device 305. For example, the transceiver 390 may be configured to communicate with the leak sensor 340, the leak catcher 345, the alarm module 350, the processing unit 375, the memory 380, etc. In some embodiments, the transceiver 390 communicates information via a wired connection, such as an Ethernet connection, one or more twisted pair wires, coaxial cables, fiber optic cables, etc. In other embodiments, the transceiver 390 communicates information via a wireless connection using microwaves, infrared waves, radio waves, spread spectrum technologies, satellites, etc. The transceiver 390 may be configured to communicate with another device using cellular networks, local area networks, wide area networks, the Internet, etc. In some embodiments, the transceiver 390 provides an interface for presenting information from the leak management device 305 to external systems, users, or memory.

Although only the processing unit 375, the memory 380, the firmware update module 385, and the transceiver 390 are shown as described herein as part of the control panel, in other embodiments, the control panel may include fewer, other, or additional components.

Referring still to FIG. 3, to power the leak management device 305, the leak management device includes a power source 395. In some embodiments, the power source 395 may be an external power supply (e.g., a conventional AC power connection (e.g., 120 Volts alternating current at 60 Hertz in the United States)) that is connected to the leak management device via an adaptor. The power source 395 may, thus, include one or more transformers, rectifiers, etc., to convert electrical power into power useable by the one or more elements of the leak management device 305, such as 1.5 Volts, 8 Volts, 12 Volts, 24 Volts, etc. In other embodiments, the power source 395 may be a battery power supply configured to provide power using one or more batteries. The batteries may be nickel-metal hydride (NiMH) batteries, lithium-ion batteries, nickel cadmium batteries, lithium polymer batteries, etc. The batteries may be inserted in a battery compartment provided in the housing 320 of the leak management device 305.

Further, in some embodiments, the batteries of the power source 395 may be rechargeable or disposable. Although not shown, in some embodiments, the leak management device 305 may have a built in battery charging unit that may be used to charge the batteries when the batteries are discharged or reach below a certain level of power. When disposable, in some embodiments, the leak management device 305 may be configured to replace the batteries and resume operation, while in other embodiments, the leak management device may be configured such that when the batteries run out, the leak management device is replaced.

In other embodiments, the leak management device 305 may be configured to draw power from, and operate from, other types of power sources. For example, the power source 395 of the leak management device 305 may be configured to use solar power, wind power, geothermal power, or other types of renewable and non-renewable energy sources. Furthermore, in some embodiments, the power source 395 of the leak management device 305 may be configured such that certain components of the leak management device are powered using one type of power supply (e.g., conventional alternating current power supply), while other components of the leak management device are powered using battery power supply.

It is to be understood that only some components and elements of the leak management system 300 are shown and described herein. Nevertheless, several other or additional components or elements that may be considered necessary or desirable to perform the functions of the leak management device 305 described herein may be included in other embodiments. For example, in some embodiments, when the alarm module 350 is configured to issue audible alarms, the leak management device 305 may include one or more speaker devices that may be used to convey the audible alarms to a user. Likewise, in some embodiments, the leak management system 300 may include fewer components and elements than described herein. Thus, the leak management system 300 is configured with a variety of features to perform a variety of functions. Specifically, the leak management system 300 is configured to provide a flexible design that may be modified to fit a variety of needs.

Figure 4:
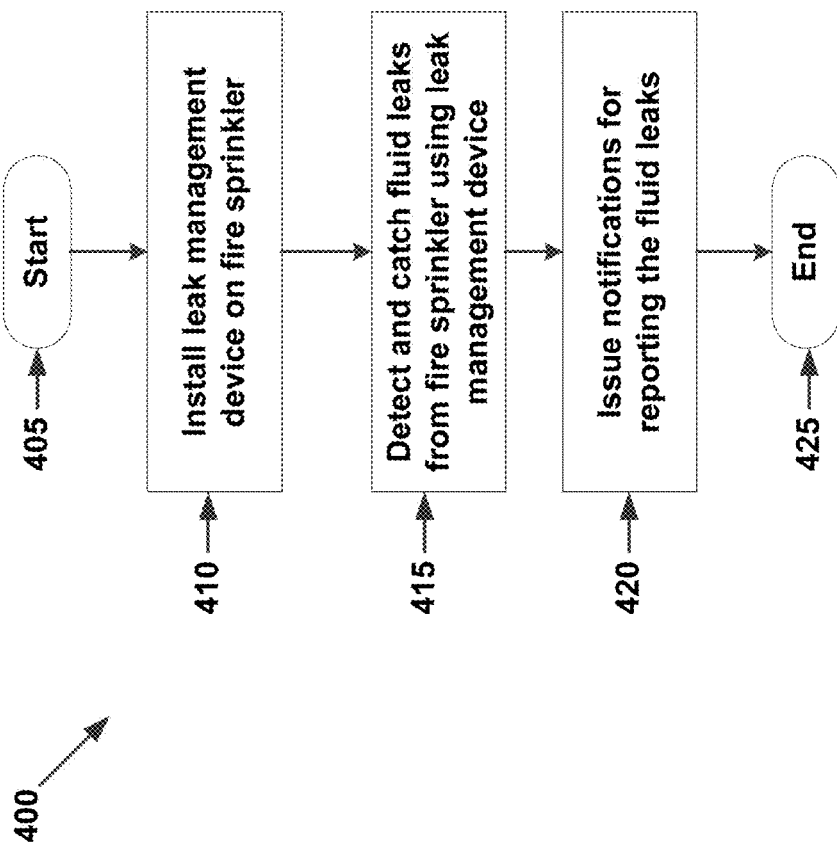
FIG. 4 is a flowchart outlining operations performed by the leak management system of FIGS. 2 and 3 in detecting and catching leaks from a fire sprinkler of the fire sprinkler system of FIG. 1, in accordance with at least some embodiments of the present disclosure.

Turning now to FIG. 4, a flowchart outlining a process 400 for using the leak management device 305 is shown, in accordance with at least some embodiments of the present disclosure. The process 400 starts at operation 405. At operation 410, the leak management device 305 is installed on, or relative to, the fire sprinkler 310. Again, the leak management device 305 may be installed on, or relative to, the fire sprinkler 310 in a variety of ways based upon the configuration of the leak sensor 340 and the leak catcher 345 of the leak management device, as well as in a manner that does not obstruct the normal operation of the fire sprinkler.

At operation 415, the leak management device 305 detects a leak from the fire sprinkler 310 using the leak sensor 340. At the operation 415, the leak management device 305 also catches the leak using the leak catcher 345. Thus, the leak management device 305 is configured to both, detect the leak and catch the leak, in a timely manner, thereby preventing damage to surrounding areas of the fire sprinkler from the leak. Furthermore, in some embodiments, the leak management device 305 may be configured to continuously monitor the fire sprinkler 310 for any leaks therefrom. In other embodiments, the leak management device 305 may be configured to periodically check the fire sprinkler 310 for leaks. Also, the leak may be a liquid leak or a non-liquid, gaseous leak. When the leak is a gaseous leak, the leak catcher 345 may not be needed, or alternatively, the leak catcher may be configured to catch gaseous leaks. Upon detecting the leak, the leak management device 305 issues one or more notifications using the alarm module 350 at operation 420. Again, the notifications may be audible alarms (chirps, tones, buzzers, etc.), visual alarms (blinking or steady lights of the LEDs 330), and/or remote or wireless alarms (text, electronic message, phone call) to one or more of the user interface device 355, the emergency response center 360, and the remote monitoring facility 365.

Furthermore, in some embodiments, the alarm module 350 may be configured to issue notifications continuously or periodically until a user takes action (e.g., turns off the alarm, stops the leak, etc.). In other embodiments, the alarm module 350 may be configured to issue notifications continuously or periodically, but only for a specified period of time. Thus, the notifications using the alarm module 350 may be configured in a variety of ways. The process 400 ends at operation 425.

Therefore, the present disclosure provides an inexpensive, light weight, and reliable leak management device (e.g., the leak management device 305) that may be removably connected to a fire sprinkler (e.g., the fire sprinkler 310) for detecting and catching leaks in a timely and reliable manner. The leak management device 305 may be mounted to the fire sprinkler in a way that does not interfere with the normal operation of the fire sprinkler 310. The leak management device 305 is also configured to issue various notifications, including audio, visual, and remote notifications, thereby alerting personnel to the need for maintenance of the fire sprinkler, and protecting the surroundings from damage.

While the leak management device 305 has been described above in the context of a fire sprinkler (e.g., the fire sprinkler 310), in other embodiments, the leak management device may be used in applications other than a fire sprinkler. For example, the leak management device 305 may be used to detect leaks in irrigation systems, water heaters, pipe joints, or any other application where detecting liquid and gaseous leaks in an easy, convenient, and cost-effective manner is desired.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the disclosure be defined by the claims appended hereto and their equivalents.

What is claimed is:

1. A device, comprising:
   a leak sensor configured to detect a leak from a fire sprinkler;
   a leak catcher configured to catch the leak before the leak makes contact with surrounding areas;
   an alarm module configured to issue a notification upon detection of the leak; and
   a mounting mechanism configured to removably mount the leak sensor, the leak catcher, and the alarm module to the fire sprinkler in a manner that does not obstruct operation of the fire sprinkler so the leak catcher can catch the leak after the fire sprinkler detects a fire.

2. The device of claim 1, wherein the notification includes an audible alarm.

3. The device of claim 1, wherein the notification includes a wireless alarm via at least one of a text message and an electronic message.

4. The device of claim 1, wherein the notification includes a visual alarm.

5. The device of claim 1, wherein the leak sensor is configured to detect the leak without being in physical contact with the leak.

6. The device of claim 1, wherein the leak sensor is integrated with the leak catcher.

7. The device of claim 1, further comprising a power source that is configured to supply battery power to the device.

8. The device of claim 1, further comprising a light emitting diode configured to provide indication of at least one operating condition of the device.

9. A method, comprising:
   mounting a leak management device removably to a fire sprinkler, wherein the mounting of the leak management device does not obstruct operation of the fire sprinkler so the leak catcher can catch the leak after the fire sprinkler detects a fire;
   detecting a leak from the fire sprinkler using a leak sensor of the leak management device;
   catching the leak from the fire sprinkler using a leak catcher of the leak management device before the leak makes contact with surrounding areas; and
   issuing at least one notification for alerting to the leak.

10. The method of claim 9, wherein issuing at least one notification comprises sounding an audible alarm.

11. The method of claim 9, wherein issuing at least one notification comprises generating a visual alarm.

12. The method of claim 9, wherein issuing at least one notification comprises sending a wireless alarm to a user interface device of a user.

13. The method of claim 9, wherein the leak management device is configured for powering using a battery source.

14. The method of claim 13, wherein the leak management device further comprises a light emitting diode to indicate a status of the battery source.

15. The method of claim 9, wherein the leak sensor is a water sensor.

16. The method of claim 9, wherein the leak sensor is configured for detecting the leak without being in physical contact with the leak.

17. A system, comprising:
- a leak management device configured to detect and catch a leak, the leak management device having:
  - a leak sensor configured to detect the leak;
  - a leak catcher configured to catch the leak before the leak makes contact with surrounding areas;
  - an alarm module configured to issue a notification upon detection of the leak by the leak sensor; and
  - a mounting mechanism configured to removably mount the leak sensor, the leak catcher, and the alarm module to a fire sprinkler in a manner that does not obstruct operation of the fire sprinkler so the leak catcher can catch the leak after the fire sprinkler detects a fire; and
- a user interface device associated with a user, the user interface device configured to receive the notification.

18. The system of claim 17, wherein the leak management device further comprises a mounting mechanism to removably mount the leak management device to a fire sprinkler in a manner that does not obstruct the operation of the fire sprinkler.

19. The system of claim 17, wherein the notification includes at least one of a text notification and an electronic message notification that is transmitted wirelessly to the user interface device.

20. The system of claim 17, wherein the leak management device is a disposable device configured to be replaced upon exhaustion of a battery power.

* * * * *